United States Patent [19]

Liu

[11] 4,132,870
[45] Jan. 2, 1979

[54] KEY TELEPHONE SYSTEM OPTICALLY COUPLED PROTECTIVE COUPLER

[75] Inventor: Chao Kai Liu, Matawan, N.J.

[73] Assignee: Bell Telephone Laboratories, Incorporated, Murray Hill, N.J.

[21] Appl. No.: 848,208

[22] Filed: Nov. 3, 1977

[51] Int. Cl.² ............................................. H04M 1/00
[52] U.S. Cl. ................................................ 179/81 R
[58] Field of Search ........................... 179/81 R, 84 R

[56] References Cited

U.S. PATENT DOCUMENTS 3,925,624  12/1975  Earle et al. ...................... 179/81 R Primary Examiner—George G. Stellar Attorney, Agent, or Firm—David H. Tannenbaum

[57] ABSTRACT

There is disclosed a protective coupler circuit of the circuit breaker type having a relay contact inserted in the communication line between the key telephone station and the central office in order to protect the central office line from hazardous voltages. A longitudinal unbalance detector is coupled with a metallic high voltage detector to control the relay operation. Circuitry is provided to operate in conjunction with the ring detection circuitry of the key telephone unit to insure proper circuit operation when ringing potential is present on the communication line even though that potential is over the threshold level of the hazardous voltage protector.

9 Claims, 2 Drawing Figures

KEY TELEPHONE SYSTEM OPTICALLY COUPLED PROTECTIVE COUPLER

BACKGROUND OF THE INVENTION

Our invention relates to a protective coupler device for insertion between a telephone station and the central office. Such protective couplers are used to insure that overvoltages which could occur as a result of a malfunction in the telephone station set or in the telephone connection system are not passed along the telephone lines to the central office.

There are two basic types of protective couplers. One type acts in much the same manner as does a fuse in that upon detection of a hazardous voltage the line is opened and remains open until the trouble condition is cleared. Such a device is shown in Gordon-Mazurek-Wright, Ser. No. 764,594, filed Feb. 1, 1977. The second type of protective coupler acts to prevent the overvoltage from being transmitted to the central office line by means of internal circuitry. The line remains connected but the hazardous voltage does not pass through a barrier. Such a circuit is shown in co-pending application of Angner-Egan-Gordon-Huryn 16-4-10-3, Ser. No. 840,593, filed Oct. 11, 1977.

A problem when such devices are used with key telephone line circuits is that at times some voltages which are over the prescribed limit must be passed over the line. An example of such a situation is the ringing voltage extended from the central office to the station. In some prior art, such "legitimate" ringing voltage is filtered from the detection circuit by a filter which blocks the low frequency usually associated with ringing voltages. Such circuits suffer from the problem that they can only work with the type of overvoltage generated between two lines, commonly called longitudinal overvoltages, and not with overvoltages which appear on only one line, called metallic overvoltage.

Accordingly, it is an object of my invention to provide a circuit for use with a key telephone line circuit to protect against both longitudinal and metallic overvoltages while still allowing certain overvoltages to appear on the line.

It is a further object to provide such a circuit that will continue to allow the circuit to function in the event of a power failure.

SUMMARY OF THE INVENTION

The objects of my invention have been realized by an arrangement whereby I have combined a longitudinal overvoltage detection signal with a metallic overvoltage detection signal to give a combined signal for control purposes. The combined signal is accomplished by using an opto-isolator circuit which combines the signals from the two detectors into a single transistor output signal. In addition to giving good control, such an arrangement solves the problem of isolation from the line.

The output signal of the single transistor is used to control a relay, the contacts of which serve to connect the key telephone line circuit to the central office line. By combining the relay operation with A-lead and ring-detect signals from the line circuit, provision is made to insure that during the ringing state the "overvoltage" of the ringing potential does not trigger the cutoff relay. This circuit operates on the principal that if an overvoltage occurs concurrently with a ring-detect signal then the detected overvoltage is most probably the ringing voltage and is to be ignored. However, if the overvoltage occured prior to the operation of the ring-detector signal then the cut-through relay is inhibited, even though the ring-detect logic subsequently operates.

I have combined the overvoltage protection circuit with an opto-coupled hybrid. Such an opto-coupled hybrid is a direct replacement for the transformer hybrid protective coupler shown in co-pending application, Ser. No. 840,593, filed Oct. 11, 1977 in the names of R. J. Angner-W. J. Egan-A. M. Gordon-W. A. Huryn Case 16-4-10-3, the major difference being the replacement of the Angner et al. transformer with an opto-coupled circuit. The replacement circuit can be entirely integratable thereby further reducing the size of the overall protective coupler package.

Accordingly, it is a major feature of my invention to provide a protective coupler for use in the key telephone environment having the properties of overvoltage protection and relying on ring-detect signals from the line circuit to insure that ringing potential does not trigger the cutoff relay.

DESCRIPTION OF THE DRAWING

The foregoing features and objects, together with the operation and utilization of the present invention, will be more fully apparent from the following description taken in conjunction with the drawing, in which.

DETAILED DESCRIPTION

Figure 1:
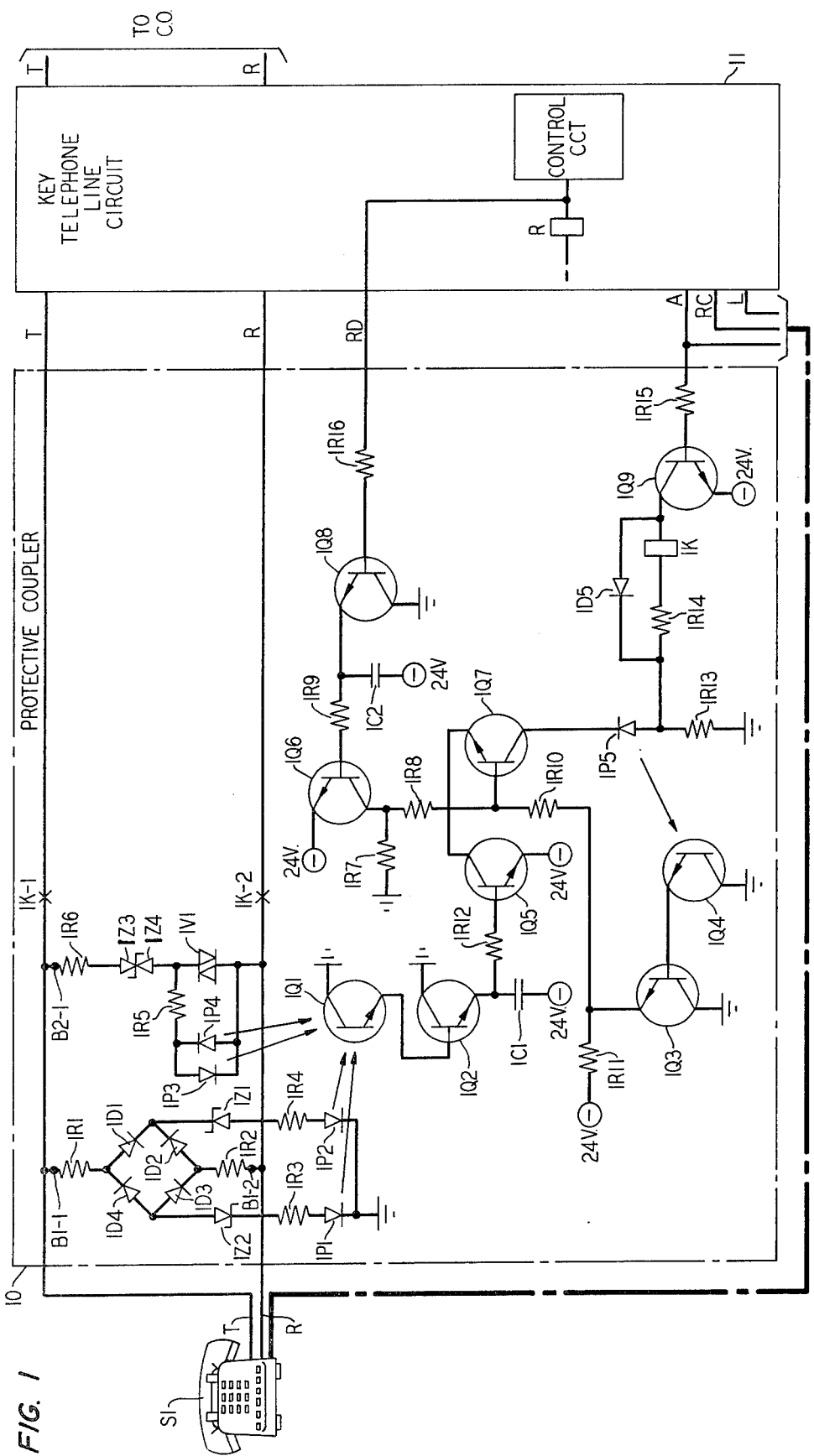
FIG. 1 shows a schematic of the protective coupler.

Protective coupler 10 is shown in FIG. 1 and contains two branches for high voltage detection, one branch between nodes B1-1 and B1-2 and a second branch shown under B2-1 and B1-2. These branches are connected across the tip and ring (T and R) leads. The branch between nodes B1-1 and B1-2 serves as a longitudinal high voltage detector. Whenever a longitudinal signal that exceeds the breakdown voltage of the zener diodes appears across tip to ground (or ring to ground), the opto-isolator circuit consisting of resistor 1R3 and photodiode 1P1 or resistor 1R4 and photodiode 1P2 is activated. Similarly, the branch between nodes B2-1 and B1-2 is a detector for metallic high voltages. Whenever a voltage signal that exceeds the breakdown voltage of the zener diodes 1Z3 or 1Z4 appears across tip and ring, either photodiode 1P3 or photodiode 1P4 is activated, depending upon the polarity of the voltage. Photodiodes 1P1, 1P2, 1P3 and 1P4 are arranged as light emitting sources, the light being directed to a common light sensitive transistor 1Q1. Thus, when either high voltage branch B1 or B2 becomes activated as a result of overvoltages on the line transistor 1Q1 turns on, turning on transistors 1Q2 and 1Q5. Resistor, capacitor combination 1R12 and 1C1 is selected to make transistor 1Q5 fast to turn on and slow to turn off so as to be able to bridge low ac power voltages.

Isolation Control Relay 1K

The connection from the station to the line circuit is controlled by a normally open, dual-contact relay 1K. The operation of relay 1K is controlled by the signals on the A-lead, in combination with signals on the ring-detect (RD) lead and the output of the high voltage detector.

The A-lead signal reflects the switchhook status. If the set is on-hook, the A-lead signal is at logic low (−24V) and transistor 1Q9 is off. Hence, there is no current flowing in the coil of relay 1K, which is non-operated or normal. When the station set goes off-hook, the A-lead signal is pulled high (ground) by the control circuit in key telephone line circuit 11 and transistor 1Q9 is turned on, thereby preparing −24V operating voltage for relay 1K. If relay 1K were to operate a connection would be established from key telephone line circuit 11 via enabled make contacts 1K-1 and 1K-2 to station S1. Key telephone line circuit can be designed as shown in R. E. Barbato, U.S. Pat. No. 3,436,488, issued Apr. 1, 1969, or in U.S. patent application Ser. No. 708,857, filed in the name of R. J. Angner et al. now U.S. Pat. No. 4,057,693, dated Nov. 8, 1977.

When ground is provided on the A-lead from key telephone line circuit 11 relay 1K would operate to ground via resistor 1R13 only if transistor 1Q7 is off. However, if transistor 1Q7 is on a shunt path exists across the coil of relay 1K from ground, through resistor 1R13, photodiode 1P5, transistor 1Q7, and transistor 1Q5 to −24V. This shunt path would inhibit relay 1K from operating. Thus, the hazardous voltage which caused the operation of transistors 1Q5 and 1Q7 is isolated from the network via contacts 1K-1 and 1K-2.

The voltage level considered as hazardous by the FCC is around 70 volts. However, the 130 volt, 20 CPS ringing signal is considered to be normal signaling. In other words, coupler circuit 10 must be able to distinguish the ringing signal from other 70 volt or higher voltages. Thus, relay 1K must remain unoperated when a hazardous voltage is detected, while it must operate in response to a normal ringing signal. For this reason, transistor 1Q7 and the opto-isolator photodiode 1P5 are required. The purpose of transistor 1Q7 is to provide ringing signal "recognition". In the situation that the station set is being rung, a ring-detect signal from key telephone line circuit 11 is provided over lead RD. This signal is provided by the control circuit of the above-mentioned Angner application or by a contact of relay B of the above-mentioned Barbata patent. This ground signal is provided to transistor 1QB turning it on causing transistor 1Q6 to turn on, thereby removing base drive from transistor 1Q7 thereby turning that transistor off. If the station set goes off-hook after the ringing has been initiated, relay 1K will operate. The operation of relay 1K will provide a dc path, via enabled make contacts 1K-1 and 1K-2, for CO battery and the ringing signal will be tripped in the conventional manner. However, it is possible that the ringing voltage will not be tripped fast enough so that the 130 volt signal will appear across the line and activate the high voltage detector, in turn turning on transistor 1Q5. Transistor 1Q5 turning on would provide a shunt path to divert the relay operating current were it not for the fact that during ringing, as discussed above, base drive is removed from transistor 1Q7. Thus, relay 1K will remain operated even though the high voltage detector detects a "hazardous" voltage (130 volt ringing signal) on the line. After ringing voltage is removed by the CO, the high voltage detector is quenched and the line goes into the busy state.

The purpose of photodiode 1P5 is to cover the situation where a hazardous voltage appears on the station side before ringing is initiated when the set is idle and relay 1K is open. In such a situation it would not be proper to allow the ground on lead RD to turn off transistor 1Q7 and remove the shunt from relay 1K as discussed above. To do so would be to allow relay 1K to operate even though a true overvoltage exists. With photodiode 1P5 in series with transistor 1Q7, transistor 1Q7 is controlled by the RD lead as well as by the emitter voltage of transistor 1Q3. Thus, if transistors 1Q5 and 1Q7 are turned on by the high voltage detector, current will flow from ground through resistor 1R13, photodiode 1P3, transistor 1Q7 and to −24V via transistor 1Q5. Current flowing through photodiode 1P5 causes light to shine on transistor 1Q4, thereby turning on transistor 1Q3 and causing the emitter voltage of transistor 1Q3 to be at logic high (0 volt). Thus, ground through resistor 1R10 is supplied to the base of transistor 1Q7 to maintain that transistor on even if ringing is detected and lead RD goes high and transistor 1Q6 turns on. Thus, as described previously, while transistor 1Q7 remains on, relay 1K is shunted and remains off after the set goes off-hook. Therefore, if there is a hazardous voltage on the station side when the set is in the idle state, relay 1K will be held open even when the set goes off-hook.

Power Failure Mode Protection

Isolation relay 1K is operated by the −24V power supply at the key telephone unit. Since a hazardous voltage on the station side may knock out the power supply, the coupler circuit should be able to provide power failure mode protection. For this reason, a normally open type relay 1K is used for isolation. In the situation where the −24V supply fails, relay 1K simply opens the line connection and isolates the network from the set.

Optically Coupled Protective Circuit

Figure 2:
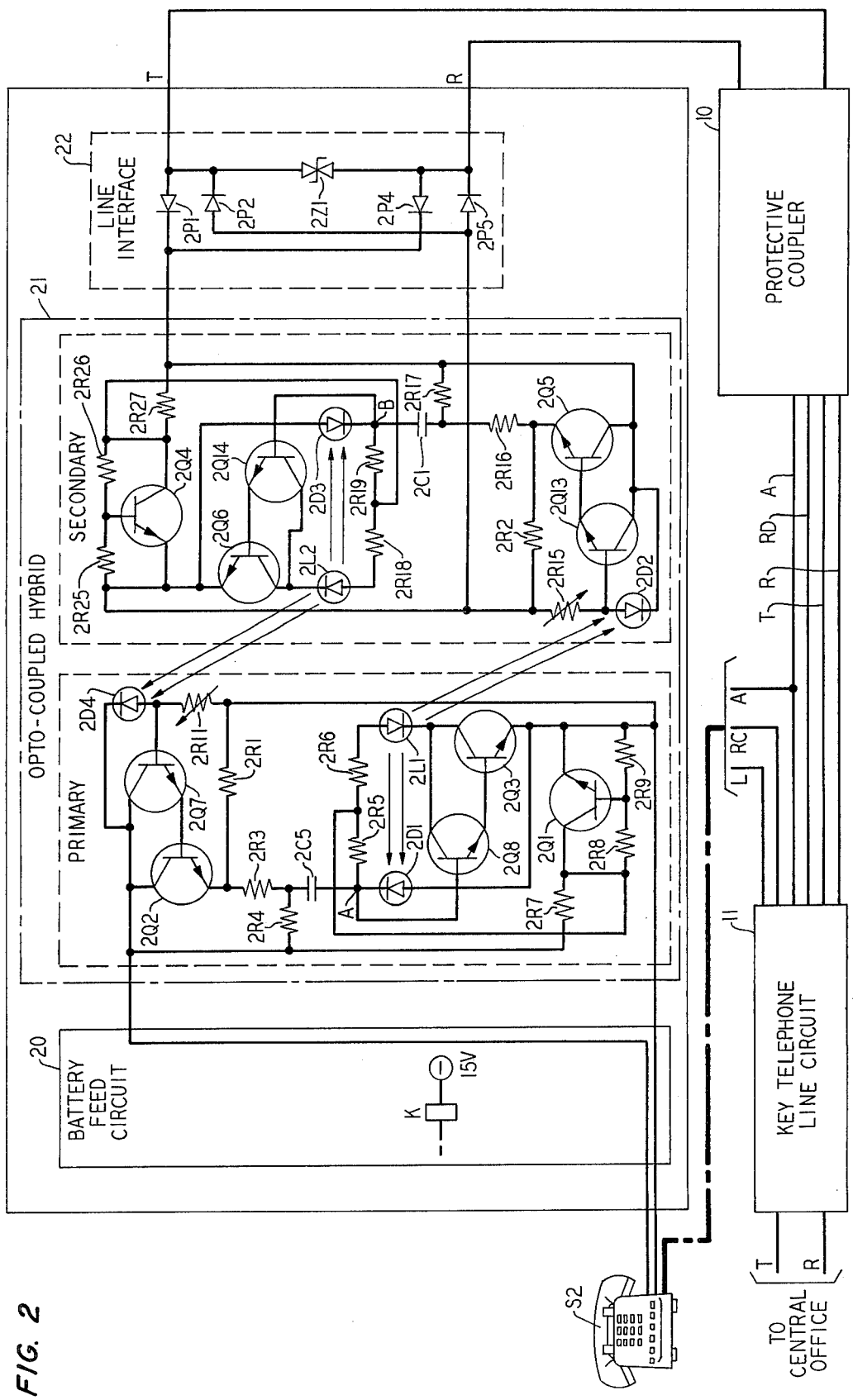
FIG. 2 shows a schematic of the opto-coupled hybrid circuit.

As shown in FIG. 2, an optically coupled protective coupler circuit is shown as a replacement for a transformer coupled circuit of the type disclosed in co-pending application filed in the name of R. J. Angner-W. J. Egan-A. M. Gordon-W. A. Huryn 16-4-10-3, Ser. No. 840,593, filed Oct. 11, 1977. To describe the circuit, it is divided into three parts: the electronic battery feed and switchhook detection circuit 20, the linear opto-coupler hybrid 21 and the CO interface 22.

The electronic battery feed and switchhook detection scheme shown is the same as shown in an application Ser. No. 800,220 filed in the name of M. L. Embree and J. F. O'Neill. Direct current from electronic feed circuit 20 is used to power the set and bias opto-coupler hybrid 21 which is a transformer equivalent, having a primary and a secondary.

The opto-coupler hybrid is a transformer equivalent. On the primary side, signals are transmitted via the opto-coupler (2L1 and 2D1) around transistor 2Q3 and 2Q8 while the emitter follower circuit around transistors 2Q2 and 2Q7 serves as a signal receiver. Similarly, on the secondary side of the opto-coupler transistors 2Q6 and 2Q14 form the transmitter, while the detecting diode 2D2 and transistor 2Q5 and 2Q13 form the receiver. Transistors 2Q1 and 2Q4 are used as level shifters to maintain a 5-volt level across their collectors and emitters when activated. These 5-volt levels are used to bias the transmitters on both sides respectively.

Signals transmitted from the station are ac coupled to the base of transistors 2Q8 which modulates the current through the light emitting diode 2L1. This signal is then optically coupled into a current through the detecting diode 2D2. Since the circuit around transistors 2Q5 and 2Q13 is an emitter follower, a voltage signal is generated across resistor 2R2 which is the same as that transmitted across the barrier. If the value of resistor 2R2 matches the load (CO line), the voltage signal transmitted from the station will be present across the tip and ring of the line (with reverse polarity). The hybrid cancellation takes place at the summing node B. Since the inputs at summing node B are two voltages with the same magnitude but reverse polarity, the transmitted signal is prevented from being reflected. Similarly, signals transmitted from the line (CO) side will be received by the station via the circuits around transistors 2Q6 and 2Q2 and summing node A. The detecting diodes 2D1 and 2D3 are used to provide negative feedback paths which will automatically compensate for the nonlinearity due to the temperature sensitivity of the opto-couplers.

Conclusions

A hazardous voltage protective coupler has been disclosed for use in conjunction with a key telephone line circuit. This circuit can be used on either side of the key telephone line circuit and will protect switching networks against hazardous voltages on customer premises, while the normal KTU functions are not changed. The protective coupler will meet the high voltage protection requirements specified by the FCC for key telephone lines and should be applicable to many other solid-state circuits that are vulnerable to hazardous voltages.

Of course, it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. A protective coupler circuit for use in conjunction with a key telephone line circuit wherein the off-hook condition of a telephone station set is controlled by an A lead signal and where the ring-detection condition is controlled by a ring-detected signal, said coupler circuit comprising a relay, having at least one contact for connection in the communication leads between the telephone station set and the central office, said relay operable under A-lead signal control for closing a communication path from said central office to said station set, detection means operable for detecting voltages greater than a fixed threshold on said communication path, means responsive to the enabling of said detection means for inhibiting the operation of said relay, and overvoltage control means responsive to a ring-detected signal for rendering said inhibiting means inoperative so as to allow said relay to operate if only ringing voltage signals are present on said communication leads.

2. The invention set forth in claim 1 further comprising means operable when said detecting means is operated prior to said ring-detection signal for inhibiting the enabling of said overvoltage control means so as to prevent said relay from operating while said detecting means remains operated.

3. The invention set forth in claim 2 wherein said detecting means includes circuits disposed between said communication leads, said circuitry being optically coupled to said inhibiting means.

4. The invention set forth in claim 1 wherein said detecting means comprises first detecting means for detecting longitudinal voltages greater than a threshold level impressed between either communication lead and ground, and second detection means for detecting voltages greater than said threshold level impressed across the communication leads.

5. The invention set forth in claim 4 wherein said detecting means is optically coupled to said inhibiting means and wherein said optically coupled detectors each have a light emitting portion and a light receiving portion and wherein the light emitting portions of said first and said second detectors are individual photodiodes and wherein the light receiving portions of said detectors is a light sensitive transistor shared in common by the light emitting portions of said first and said second detectors.

6. The invention set forth in claim 4 further comprising means operable when said detecting means is operated prior to said ring-detection signal for inhibiting the enabling of said overvoltage means so as to prevent said relay from operating while said detecting means remains operated.

7. The invention set forth in claim 6 wherein said overvoltage means is optically coupled to said inhibiting means.

8. The invention set forth in claim 1 further comprising an optically coupled hybrid connected between said protective coupler and said telephone station set.

9. The invention set forth in claim 1 wherein said relay is controlled by power lead to said key telephone line circit so that in the event of a power failure at said line circuit said relay will remain unoperated thereby maintaining said communication leads open.

* * * * *